US012770285B2

(12) United States Patent
Mikhisor et al.

(10) Patent No.: US 12,770,285 B2
(45) Date of Patent: Oct. 20, 2026

(54) METHOD AND SYSTEM FOR LIVESTOCK MONITORING AND MANAGEMENT

(71) Applicant: OMNIEYE HOLDINGS LIMITED, Oamaru (NZ)

(72) Inventors: Maria Mikhisor, Dunedin (NZ); Benoit Auvray, Dunedin (NZ)

(73) Assignee: OMNIEYE HOLDINGS LIMITED, Oamaru (NZ)

( * ) Notice: Subject to any disclaimer, the term of this patent is extended or adjusted under 35 U.S.C. 154(b) by 284 days.

(21) Appl. No.: 18/567,685

(22) PCT Filed: Jun. 13, 2022

(86) PCT No.: PCT/IB2022/055471
§ 371 (c)(1),
(2) Date: Dec. 6, 2023

(87) PCT Pub. No.: WO2022/264010
PCT Pub. Date: Dec. 22, 2022

(65) Prior Publication Data

US 2024/0265567 A1 Aug. 8, 2024

(30) Foreign Application Priority Data

Jun. 14, 2021 (NZ) ........................................ 777173

(51) Int. Cl.
*G06T 7/70* (2017.01)
*A01K 29/00* (2006.01)
(Continued)

(52) U.S. Cl.
CPC .............. *G06T 7/70* (2017.01); *A01K 29/005* (2013.01); *G06T 7/80* (2017.01); *G06V 40/10* (2022.01); *G06T 2207/10028* (2013.01)

(58) Field of Classification Search
CPC .......................... G06T 7/70; G06T 7/80; G06T 2207/10028; A01K 29/005; G06V 40/10; G06V 10/19;
(Continued)

(56) References Cited

U.S. PATENT DOCUMENTS 9,124,873 B2 * 9/2015 Liu ............................ G06T 7/75
10,284,794 B1 * 5/2019 Francois ................... G06T 7/33
(Continued)

FOREIGN PATENT DOCUMENTS

CN 108154526 * 6/2018
CN 111339850 * 6/2020
EP 3 573 024 * 5/2019
WO WO 2020/114234 * 6/2020
WO 2020204784 A1 10/2020

OTHER PUBLICATIONS

Machine translation for WO 2020/114234 (Year: 2020).*
(Continued)

*Primary Examiner* — Qian Yang
(74) *Attorney, Agent, or Firm* — Alliance IP, LLC

(57) ABSTRACT

A system and method for monitoring livestock is disclosed. In the illustrative embodiment, calibration patterns are placed on the ground in the field of view of a camera. The calibration patterns are used to generate homographies usable to determine a 3D position of a 2D position on the ground in images captured by the camera. If a gravity direction is also determined, then the 3D position of objects can be determined if a point on the ground along the gravity shadow of the object can also be identified. The identified positions of objects may be used to determine if livestock is lame.

20 Claims, 10 Drawing Sheets

(51) Int. Cl.
*G06T 7/80* (2017.01)
*G06V 40/10* (2022.01)

(58) Field of Classification Search
CPC ...... G06V 20/647; G06V 20/52; G16H 50/20; G16H 30/40
See application file for complete search history.

(56) References Cited

U.S. PATENT DOCUMENTS

| | | | | |
|---|---|---|---|---|
| 10,659,923 | B2 * | 5/2020 | Wirola | G01C 21/166 |
| 10,885,328 | B2 | 1/2021 | Greveson et al. | |
| 10,897,575 | B2 | 1/2021 | Wheeler et al. | |
| 11,044,400 | B1 * | 6/2021 | Farag | H04N 23/698 |
| 11,226,193 | B2 | 1/2022 | Yeoh et al. | |
| 2005/0169367 | A1 | 8/2005 | Venetianer et al. | |
| 2006/0078215 | A1 * | 4/2006 | Gallagher | G06T 3/00 382/254 |
| 2010/0246901 | A1 | 9/2010 | Yang | |
| 2010/0295948 | A1 | 11/2010 | Xie et al. | |
| 2012/0162374 | A1 | 6/2012 | Markas et al. | |
| 2014/0055573 | A1 | 2/2014 | Lee et al. | |
| 2014/0098229 | A1 | 4/2014 | Lu et al. | |
| 2017/0223338 | A1 | 8/2017 | Kang et al. | |
| 2018/0189532 | A1 | 7/2018 | Bataller et al. | |
| 2018/0376068 | A1 * | 12/2018 | Shimatani | H04N 23/57 |
| 2020/0013186 | A1 | 1/2020 | Zhang et al. | |
| 2020/0045249 | A1 * | 2/2020 | Francois | G06F 3/0484 |
| 2021/0279957 | A1 | 9/2021 | Eder et al. | |
| 2021/0374976 | A1 * | 12/2021 | Lee | G06T 7/60 |

OTHER PUBLICATIONS

Machine translation for CN 108154526 (Year: 2018).*

Machine translation for CN 111339850 (Year: 2020).*

Babaee-Kashany, Vahid, et al.; "Camera Pose Estimation in Soccer Scenes Based on Vanishing Points," 2010 IEEE International Symposium on Haptic Audio Visual Environments and Games; Oct. 2010; 6 pages.

Cavagna, Andrea, et al.; "Error Control in the Set-up of Stereo Camera Systems for 3D Animal Tracking;" retrieved from the Internet at https://arxiv.org/pdf/1510.01070; Oct. 5, 2015; 14 pages.

Kang, Xi, et al.; "A Review: Development of Computer Vision-Based Lameness Detection for Dairy Cows and Discussion of the Practical Applications;" retrieved from the Internet at https://www.mdpi.com/journal/sensors; published Jan. 22, 2021; 26 pages.

McDonagh, John, et al.; "Detecting Dairy Cow Behavior Using Vision Technology;" retrieved from the Internet at https://www.mdpi.com/journal/agriculture; published Jul. 17, 2021; 8 pages.

Olivares-Mendez, Miguel A., et al.; "Towards an Autonomous Vision-Based Unmanned Aerial System against Wildlife Poachers," retrieved from the Internet at https://www.mdpi.com/1424-8220/15/12/29861/htm; published Dec. 12, 2015; 30 pages.

PCT International Search Report and Written Opinion issued in PCT/IB2022/055471, dated Oct. 27, 2022; 13 pages.

Yan, Yizhen, et al.; "Automatic Checkerboard Detection for Camera Calibration Using Self-Correlation," 35 pages.

Zhang, Zhengyou, et al.; "A Flexible New Technique for Camera Calibration," Microsoft Research, Technical Report MSR-TR-98-71; Dec. 2, 1998; 22 pages.

* cited by examiner

METHOD AND SYSTEM FOR LIVESTOCK MONITORING AND MANAGEMENT

CROSS REFERENCE TO RELATED APPLICATIONS

This Application is a national phase filing under 35 U.S.C. § 371 of International Patent Application Serial No. PCT/IB2022/055471, filed Jun. 13, 2022, and entitled, "METHOD AND SYSTEM FOR LIVESTOCK MONITORING AND MANAGEMENT," which claims the benefit of, and priority from, New Zealand Patent Application Serial No. NZ 777173, filed Jun. 14, 2021, and entitled, "METHOD AND SYSTEM FOR LIVESTOCK MONITORING AND MANAGEMENT," the entire disclosures of which are incorporated herein by reference.

FIELD OF THE INVENTION

The disclosure relates to a method and system for livestock monitoring and management. More particularly, the disclosure relates to a method for determining a three-dimensional (3D) position of a point in a two-dimensional (2D) image of a livestock animal or part thereof.

BACKGROUND

Monitoring and management of animals such as livestock has the potential to present a labour-intensive task. Some techniques require animals to be tagged for identification. Other techniques require animals to be fitted with devices such as intelligent collars.

Some techniques attempt to reduce labour though the use of various types of cameras. Such cameras may include, for example, RGB, three-dimensional (3D), thermal, IR, and hyperspectral cameras. Some techniques further include one or more of computer vision techniques, machine learning, and statistical models. Such techniques may be used to predict animal characteristics that can be used for automated and remote monitoring, identification and/or real-time management.

It is helpful to identify 3D objects within camera images in order to predict animal characteristics. It can be difficult to reconstruct 3D objects from images captured by a single camera in the absence of parallel and/or perpendicular planes. Prior techniques for single view metrology require parallel and perpendicular flat planes. One example includes city landscapes that have parallelepiped structures such as buildings.

It is not always possible to identify parallel or perpendicular flat planes within an environment. An area that may be suitable for livestock handling, for example, may involve an unconstrained environment with no clear horizontal or vertical surfaces.

It is an object of at least preferred embodiments to address at least some of the aforementioned disadvantages. An additional or alternative object is to at least provide the public with a useful choice.

SUMMARY OF THE INVENTION

The disclosure relates to a method for determining a three-dimensional (3D) position of a point in a two-dimensional (2D) image of an environment. The method comprises receiving the image of the environment, the image associated with a plurality of homographies mapping between points in an image plane and points in the environment: identifying, within the image, a reference surface within the environment; determining respective 3D position estimates of a first point on the reference surface at least partly from two or more of the plurality of homographies; and determining the 3D position of the first point in the 2D image at least partly from an average of at least two of the 3D position estimates.

At least some of the plurality of homographies may be associated with a portion of the reference surface with varying slope.

Determining the 3D position of the point in the 2D image may comprise determining the 3D position at least partly from a weighted average of the at least two of the 3D position estimates, wherein a weighting assigned to one of the 3D position estimates from a homography closer to the first point is higher than a weighting assigned to one of the 3D position estimates from a homography further from the first point.

The method of may further comprise determining a reference projection direction within the environment; and determining a 3D position of a second point in the image based at least partly from an intersection of a first ray substantially parallel to the reference projection direction extending through the first point and a second ray extending through both the second point and a camera optical centre.

The reference surface may comprise a ground surface within the environment, and the reference projection direction comprises a direction of gravity within the environment.

The first point may be on a ray that extends through first points of other images with the same perspective of the 3D environment. Each of the first points of other images may correspond to different positions of a moving object on the reference surface.

The image may capture a plurality of calibration patterns on the reference surface.

The techniques in one aspect comprises several steps. The relation of one or more of such steps with respect to each of the others, the apparatus embodying features of construction, and combinations of elements and arrangement of parts that are adapted to affect such steps, are all exemplified in the following detailed disclosure.

This techniques may also be said broadly to consist in the parts, elements and features referred to or indicated in the specification of the application, individually or collectively, and any or all combinations of any two or more said parts, elements or features, and where specific integers are mentioned herein which have known equivalents in the art to which this disclosure relates, such known equivalents are deemed to be incorporated herein as if individually set forth.

In addition, where features or aspects of the techniques are described in terms of Markush groups, those persons skilled in the art will appreciate that the techniques is also thereby described in terms of any individual member or subgroup of members of the Markush group.

As used herein, '(s)' following a noun means the plural and/or singular forms of the noun.

As used herein, the term 'and/or' means 'and' or 'or' or both.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9, and 10) and also any range of rational numbers within that range (for example, 2 to 8, 1.5 to 5.5, and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

In this specification, where reference has been made to patent specifications, other external documents, or other sources of information, this is generally for the purpose of providing a context for discussing the features of the disclosure. Unless specifically stated otherwise, reference to such external documents or such sources of information is not to be construed as an admission that such documents or such sources of information, in any jurisdiction, are prior art or form part of the common general knowledge in the art.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Although the present disclosure is broadly as defined above, those persons skilled in the art will appreciate that embodiments are not limited thereto and that the disclosure also includes embodiments of which the following description gives examples.

BRIEF DESCRIPTION OF THE DRAWINGS

Preferred forms of a method and system for determining a three-dimensional (3D) position of a point in a two-dimensional (2D) image of an environment will now be described by way of example only with reference to the accompanying figures in which.

DETAILED DESCRIPTION

In one embodiment, a method reconstructs three-dimensional (3D) objects in an unconstrained environment with uneven ground surface using single view calibrated camera. The method of 3D reconstruction only requires a fixed camera and some sort of ground surface. No man-made structures need to be in a camera view to perform 3D reconstruction.

Figure 1:
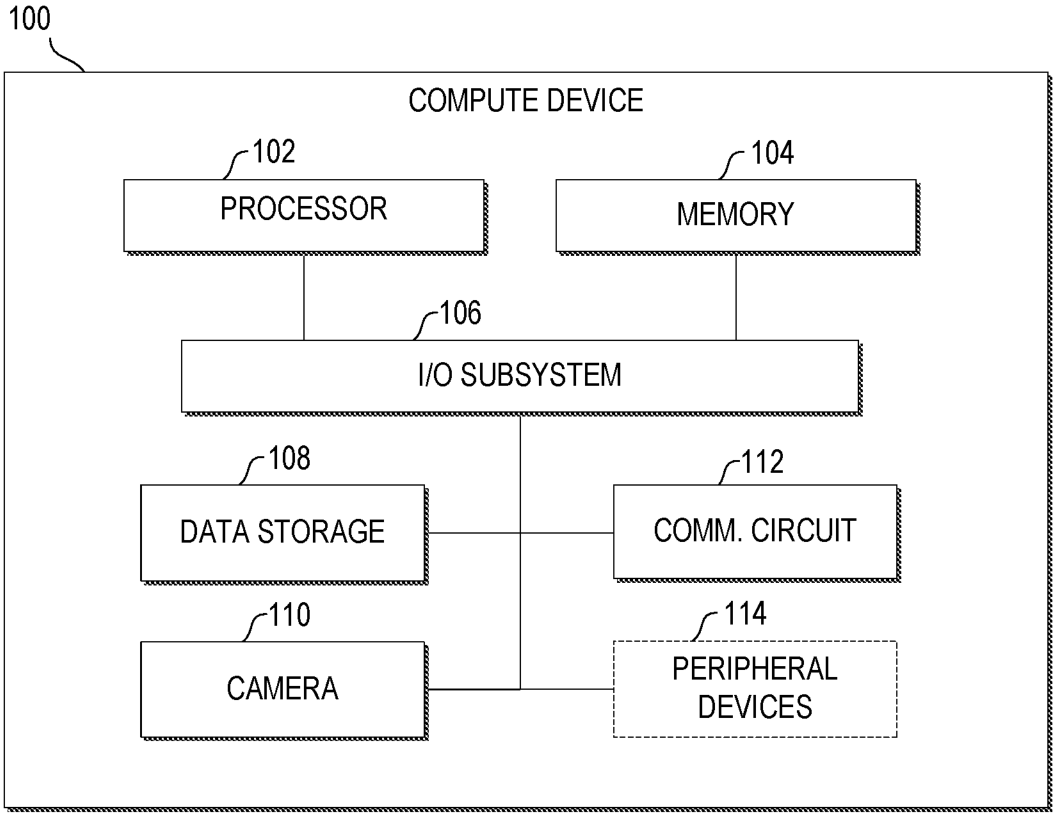
FIG. 1 is a simplified block diagram of at least one embodiment of a compute device.

Referring now to FIG. 1, a simplified block diagram of an illustrative compute device 100 is shown. In use and as described in more detail below, the camera 110 captures one or more images of an environment, such as an environment with livestock. The camera 110 is calibrated using calibration patterns positioned on the ground at various points in the environment. After the camera 110 is calibrated, it can be used to monitor the 3D position of objects in the environment.

The compute device 100 may be embodied as any type of compute device. For example, the compute device 100 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, a distributed computing system, and/or any other computing device. The illustrative compute device 100 includes a processor 102, a memory 104, an input/output (I/O) subsystem 106, data storage 108, a camera 110, a communication circuit 112, and one or more optional peripheral devices 114. In some embodiments, one or more of the illustrative components of the compute device 100 may be incorporated in, or otherwise form a portion of, another component. For example, the memory 104, or portions thereof, may be incorporated in the processor 102 in some embodiments.

In some embodiments, the compute device 100 may be located in a data center with other compute devices 100, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves), a micro data center, etc.

The processor 102 may be embodied as any type of processor capable of performing the functions described herein. For example, the processor 102 may be embodied as a single or multi-core processor(s), a single or multi-socket processor, a digital signal processor, a graphics processor, a neural network compute engine, an image processor, a microcontroller, an infrastructure processing unit (IPU), a data processing unit (DPU), an xPU, or other processor or processing/controlling circuit.

The memory 104 may be embodied as any type of volatile or non-volatile memory or data storage capable of performing the functions described herein. In operation, the memory 104 may store various data and software used during operation of the compute device 100, such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the compute device 100. For example, the I/O subsystem 106 may be embodied as, or otherwise include, memory controller hubs, input/output control hubs, firmware devices, communication links (e.g., point-to-point links, bus links, wires, cables, light guides, printed circuit board traces, etc.) and/or other components and subsystems to facilitate the input/output operations. The I/O subsystem 106 may connect various internal and external components of the compute device 100 to each other with use of any suitable connector, interconnect, bus, protocol, etc., such as an SoC fabric, PCIe®, USB2, USB3, USB4, NVMe®, Thunderbolt®, and/or the like. In some embodiments, the I/O subsystem 106 may form a portion of a system-on-a-chip (SoC) and be incorporated, along with the processor 102, the memory 104, the communication circuit 112, and other components of the compute device 100 on a single integrated circuit chip.

The data storage 108 may be embodied as any type of device or devices configured for the short-term or long-term storage of data. For example, the data storage 108 may include any one or more memory devices and circuits, memory cards, hard disk drives, solid-state drives, or other data storage devices.

The communication circuit 112 may be embodied as any type of interface capable of interfacing the compute device 100 with other compute devices, such as over one or more wired or wireless connections. In some embodiments, the communication circuit 112 may be capable of interfacing with any appropriate cable type, such as an electrical cable or an optical cable. The communication circuit 112 may be configured to use any one or more communication technology and associated protocols (e.g., Ethernet, Bluetooth®, Wi-Fi®, WiMAX, near field communication (NFC), etc.). The communication circuit 112 may be located on silicon separate from the processor 102, or the communication circuit 112 may be included in a multi-chip package with the processor 102, or even on the same die as the processor 102. The communication circuit 112 may be embodied as one or more add-in-boards, daughtercards, network interface cards, controller chips, chipsets, specialized components such as a field-programmable gate array (FPGA) or application-specific integrated circuit (ASIC), or other devices that may be used by the compute device 102 to connect with another compute device. In some embodiments, communication circuit 112 may be embodied as part of a system-on-a-chip (SoC) that includes one or more processors, or included on a multichip package that also contains one or more processors. In some embodiments, the communication circuit 112 may include a local processor (not shown) and/or a local memory (not shown) that are both local to the communication circuit 112. In such embodiments, the local processor of the communication circuit 112 may be capable of performing one or more of the functions of the processor 102 described herein. Additionally or alternatively, in such embodiments, the local memory of the communication circuit 112 may be integrated into one or more components of the compute device 102 at the board level, socket level, chip level, and/or other levels.

The camera 110 may be any suitable camera that can capture image or video. The camera 110 may include one or more fixed or adjustable lenses and one or more image sensors. The image sensors may be any suitable type of image sensors, such as a CMOS or CCD image sensor. The camera 110 may have any suitable aperture, focal length, field of view, etc. For example, the camera 110 may have a field of view of 20° or less to 180° or more in the azimuthal and/or elevation directions. In some embodiments, the camera 110 may be directly connected to the compute device 100. In other embodiments, the camera 110 may be remote from other components of the compute device 100. For example, the camera 110 may be positioned to view livestock, and the camera 110 may send images to a compute device that is located at a server or other compute device in a remote location.

In some embodiments, the compute device 100 may include other or additional components, such as those commonly found in a compute device. For example, the compute device 100 may also have peripheral devices 114, such as a keyboard, a mouse, a speaker, a microphone, a display, a camera, a battery, an external storage device, etc.

Figure 2:
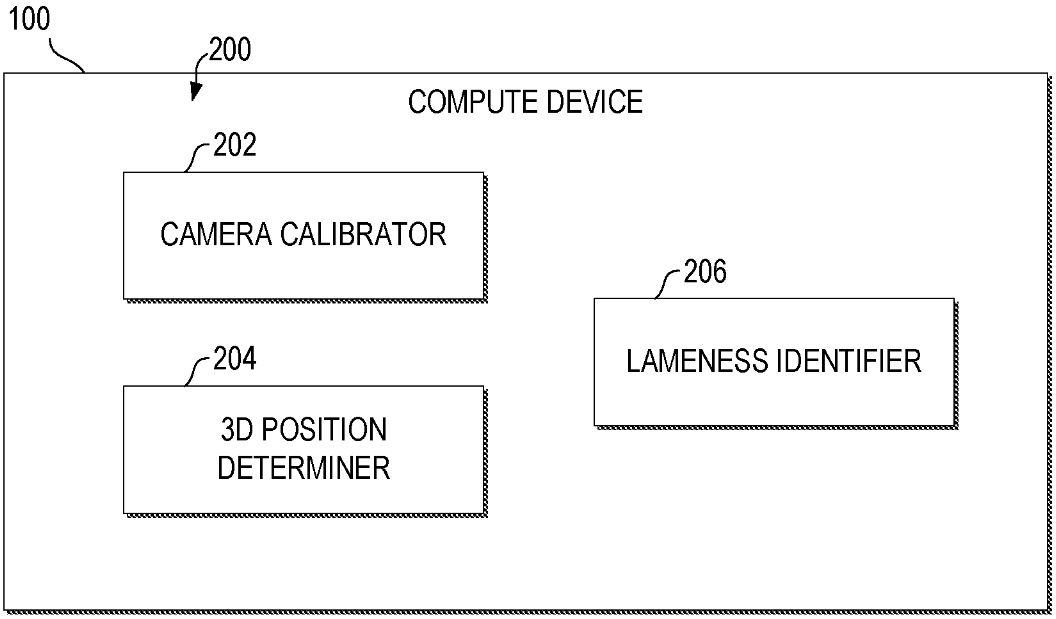
FIG. 2 is a simplified block diagram of at least one embodiment of an environment that may be established by the compute device of FIG. 1.

Referring now to FIG. 2, in an illustrative embodiment, the compute device 100 establishes an environment 200 during operation. The illustrative environment 200 includes a camera calibrator 202, a 3D position determiner 204, and a lameness identifier 206. The various modules of the environment 200 may be embodied as hardware, software, firmware, or a combination thereof. For example, the various modules, logic, and other components of the environment 200 may form a portion of, or otherwise be established by, the processor 102 or other hardware components of the compute device 100 such as the memory 104, the data storage 108, etc. As such, in some embodiments, one or more of the modules of the environment 200 may be embodied as circuitry or collection of electrical devices (e.g., camera calibrator circuitry 202, 3D position determiner circuitry 204, and lameness identifier circuitry 206, etc.). It should be appreciated that, in such embodiments, one or more of the circuits (e.g., the camera calibrator circuitry 202, the 3D position determiner circuitry 204, and the lameness identifier circuitry 206, etc.) may form a portion of one or more of the processor 102, the memory 104, the I/O subsystem 106, the data storage 108, the camera 110, and/or other components of the compute device 100. For example, in some embodiments, some of the modules may be partially or completely implemented by the processor 102 and/or the memory 104. In some embodiments, some or all of the modules may be embodied as the processor 102 as well as the memory 104 and/or data storage 108 storing instructions to be executed by the processor 102. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 102 or other components of the compute device 100. It should be appreciated that some of the functionality of one or more of the modules of the environment 200 may require a hardware implementation, in which case embodiments of modules that implement such functionality will be embodied at least partially as hardware.

The camera calibrator 202 is configured to calibrate the camera 110. First, a user of the compute device 100 positions a calibration pattern 404 on a reference surface 406. The user may position the calibration pattern 404 in any suitable manner, such as at the direction of the camera calibrator 202, in a pattern of an environment that covers some or all of the relevant ground surface of the environment, etc. The user may place calibration patterns 404 one at a time or may place multiple calibration patterns 404 in one image. The calibration pattern may be, e.g., a checkerboard pattern, a triangular grid, a square grid, a circle hexagonal grid, a circle regular grid, or other predetermined pattern.

The camera calibrator 202 then captures one or more images of the calibration pattern 404. The camera calibrator 202 determines a homography to relate 3D positions on the ground near the calibration pattern 404 to 2D positions on images captured by the camera 110. The camera calibrator 202 can store the homography, such as in the data storage 108. In some embodiments, the camera calibrator 202 sends the homography to a remote compute device 100.

After the camera calibrator 202 captures the calibration pattern 404 at one position, the user can move the calibration pattern 404 to another position. The new position of the calibration pattern 404 may overlap with the previous position of the calibration pattern 404 or may not overlap. The camera calibrator 202 can then capture the calibration pattern 404 and determine a new homography for a new position in the 2D image.

Additionally, in the illustrative embodiment, the camera calibrator 202 determines a direction of gravity. The camera calibrator 202 may determine a direction of gravity by identifying one or more vertical structures, such as posts 408. In some embodiments, the camera calibrator 202 may determine a direction of gravity based on a weight hanging on a string. In other embodiments, a user may identify a direction of gravity.

The 3D position determiner 204 is configured to determine the 3D position of one or more objects in images captured by the camera 110 after calibration. In the illustrative embodiment, the 3D position determiner 204 accesses one or more homographies, such as one or more homographies created using the camera calibrator 202. The 3D position determiner 204 may access one or more homographies based on an area of interest identified in the one or more images. The 3D position determiner 204 also determines a gravity direction, such as by accessing a saved gravity direction determined by the camera calibrator 202.

The 3D position determiner 204 identifies the position of a hoof or other part of an animal that is in contact with the ground in the images captured by the camera 110, and the 3D position determiner 204 identifies a 3D position of the hoof or other part of the animal based on the position of the hoof or other part of the animal in the 2D image captured by the camera 110 and one or more homographies. The 3D position determiner 204 may identify a hoof or other animal part that is touching the ground in any suitable manner. The 3D position determiner 204 may determine a position estimate using each of several homographies, and then the 3D position determiner 204 may determine a final position based on a weighted average of the position estimates. The weighted average may weight the position estimates based on a distance between the hoof or other animal part being identified and the calibration pattern 404 corresponding to the homography.

The 3D position determiner 204 determines the positions of hoofs not touching the ground in one or more images. In the illustrative embodiment, the 3D position determiner 204 identifies the 3D location of two consecutive positions 304*a* and 304*c* of the same hoof 704 on the ground. The 3D position determiner 204 identifies a line connecting these two points. For example, the line 702 connects the position 304*a* where the hoof 704 was placed on the ground and the position 304*c* wherein the animal next placed its hoof. Given the line 702 and the position of the hoof 704 in the 2D image (for example, 2D point 604*b*) between the points 304*a* and 304*c*, the 3D position determiner 204 can determine the 3D position of the hoof, assuming that the hoof 704 followed a path in a plane defined by the line 702 and the gravity direction.

Figure 8:
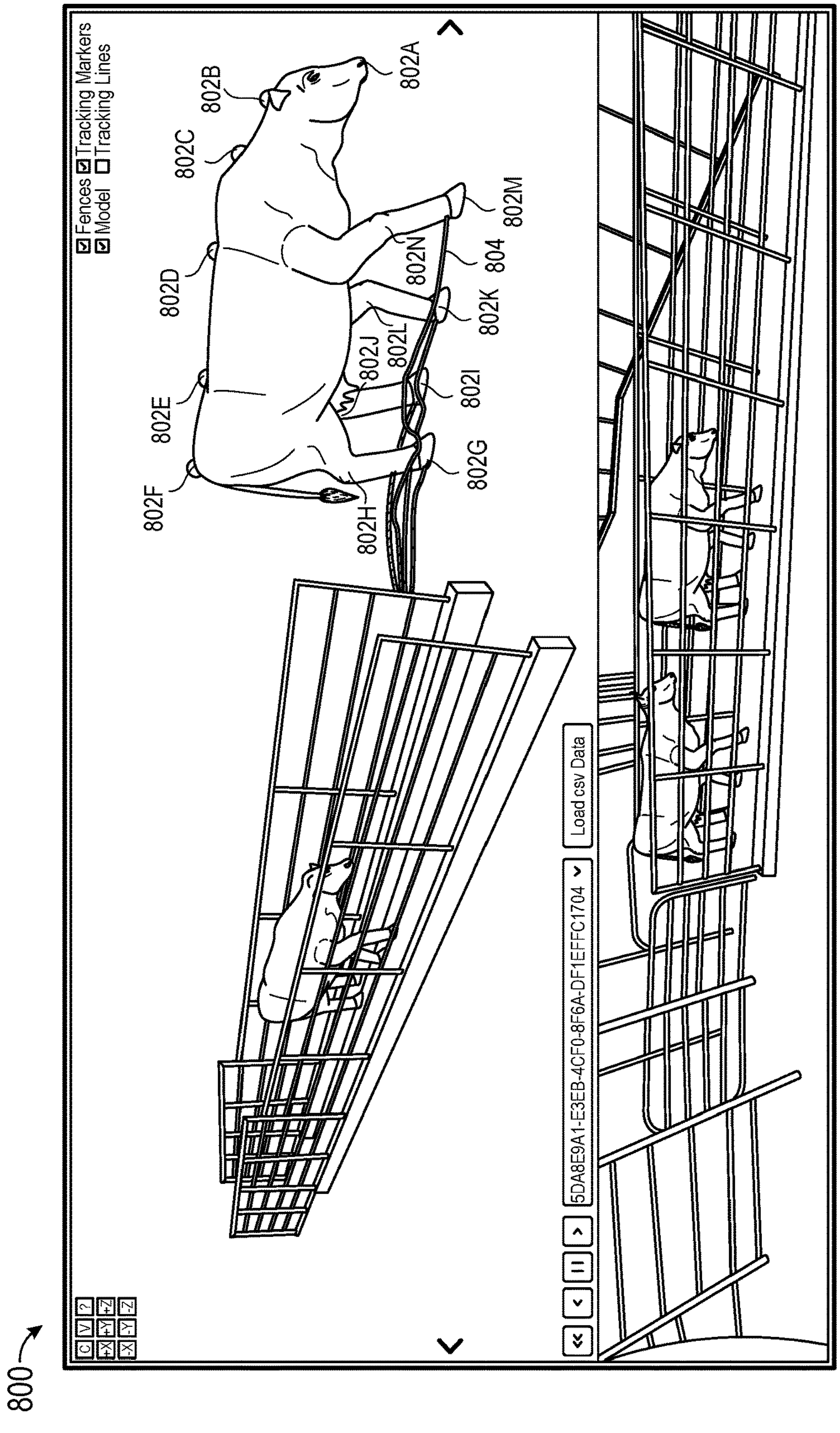
FIG. 8 shows an example of reconstruction of an environment as captured in an image.

In the illustrative embodiment, the 3D position determiner 204 determines the 3D position of several points on an animal's body in one or more images. For example, the 3D position determiner 204 may determine the location of a nose 802A, a top of the head 802B, a base of the neck 802C, a first point on the back 802D, a second point on the back 802E, the top of the rump 802F, hoofs 802G, 802I, 802K, 802M, and ankles 802H, 802J, 802L, 802N. The 3D position determiner 204 may determine a path 804 that each point 802A-802N takes, as shown in FIG. 8 for the hoof 802M. The various points of the animal may be identified in any suitable manner, such as using the homographies, a machine-learning based model, the 3D hoof positions, etc.

The lameness identifier 206 is configured to analyse the positions of various parts of the animal's body to determine whether the animal is lame. The lameness identifier 206 may analyse parameters such as step length, joint stiffness, pose, etc. The lameness identifier 206 may use any suitable technique to determine whether an animal is lame, such as a machine-learning-based model.

If an animal is identified as lame, the lameness identifier 206 can alert an administrator or other person that the animal is lame, such as by writing a message to a log file, sending an email, sending a text message, sending an online alert, etc In the illustrative embodiment, the compute device 100 includes the camera 110, the camera calibrator 202, the 3D position determiner 204, and the lameness identifier 206. In other embodiments, different compute device may include different components. For example, in one embodiment, a first compute device 100 may capture one or more calibration images with the camera 110 that include one or more calibration patterns 404. A second compute device 100 with a camera calibrator 202 can be used to process the calibration images to determine one or more homographies. A third compute device 100 with a 3D position determiner 204 can then process images captured by the camera 110 using the homographies determined by the second compute device 100. A fourth compute device 100 with a lameness identifier 206 may then use the determined 3D positions to identify lame livestock.

Figure 3:
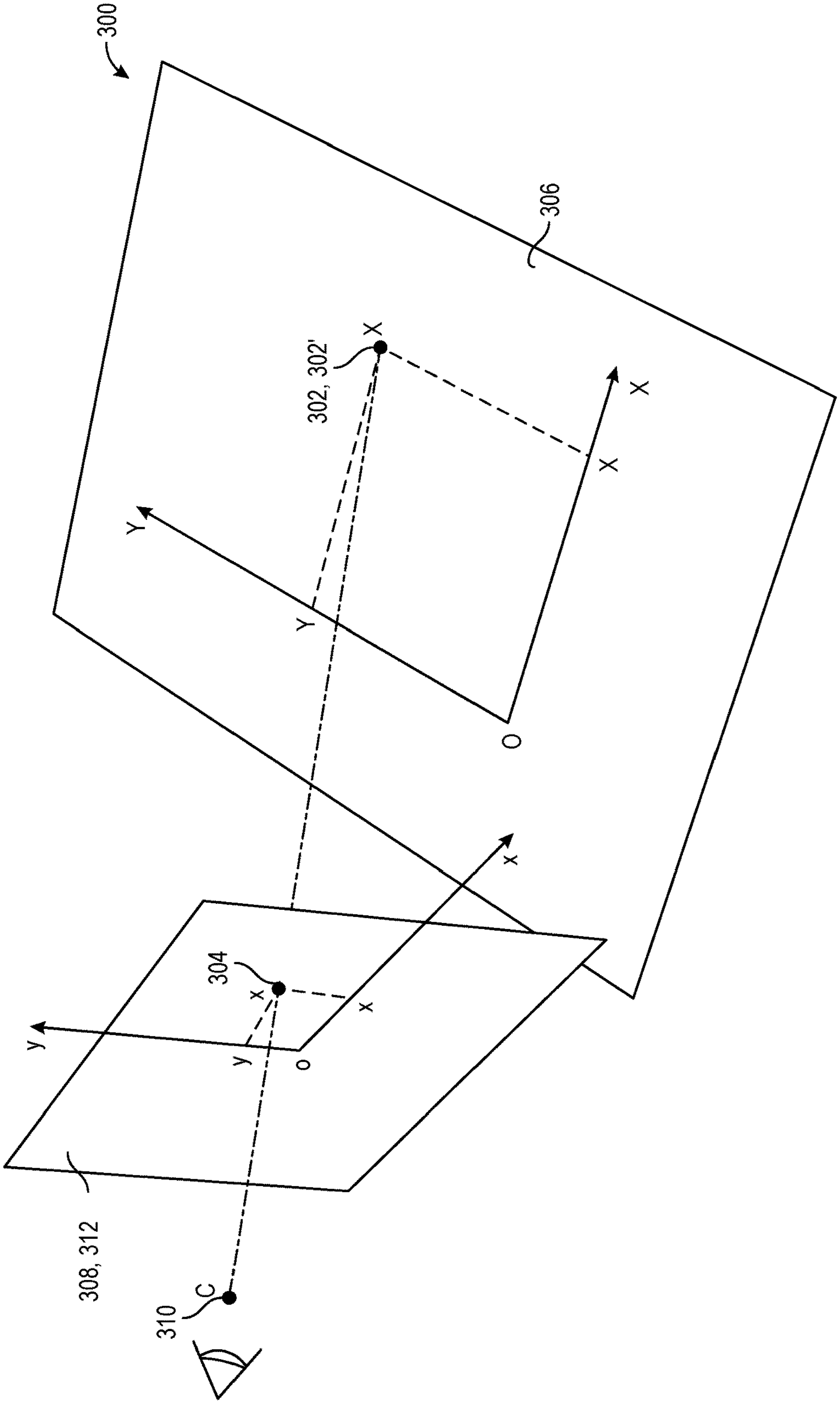
FIG. 3 shows an example system for determining a 3D position of a point.
Figure 4:
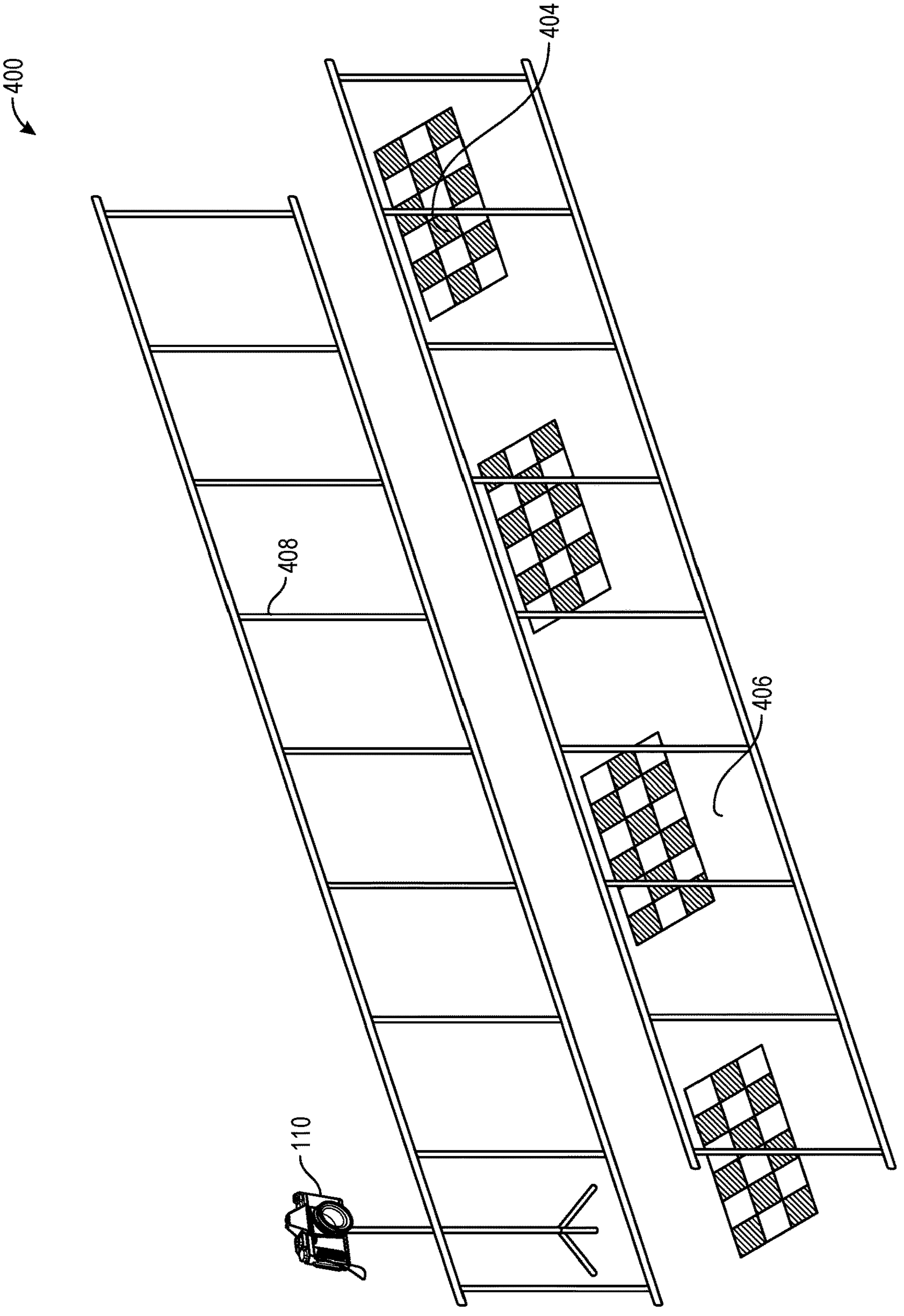
FIG. 4 shows a single fixed camera that may be used to obtain an image.

Referring to FIGS. 3 and 4, a method for determining a 3D position 302 of a point 304 in a two-dimensional (2D) image 308 of an environment 400 is described. The method comprises receiving the image 308 of the environment 400. The image 308 is associated with a plurality of homographies mapping between points in an image plane 312 and points in the environment 400. Each of the plurality of homographies is calibrated with patterns 404 on a reference surface 406 identified within the image 308 within the environment 400. The reference surface 406 can have varying slope.

The method determines 3D position 302, on the reference surface 406, of the first point 304 in the image 308 based on the multiple homographies (and a camera optical center 310 of the image 308). Three-dimensional (3D) position estimates 302' of the first point 304 on the reference surface 406 are determined at least partly from one or more of the plurality of homographies. In an example, a single 3D position estimate 302' is determined for each of at least some of the multiple homographies. The 3D position 302 of the first point 304 is determined based at least partially on one or on the average of at least two of the 3D position estimates 302'. The 3D position estimates 302' can be weighted.

FIG. 4 shows a single fixed camera 110 that may be used to obtain the image 308 for determining the 3D positions of objects in the 3D environment or scene 400. In an example, the camera has a wide-angle lens or a fisheye lens in order to obtain a wider range of view.

The camera is calibrated intrinsically, where the internal parameters of the camera are known. Examples of internal parameters of the camera include the focal length, skew, distortion and image centre.

Figure 5:
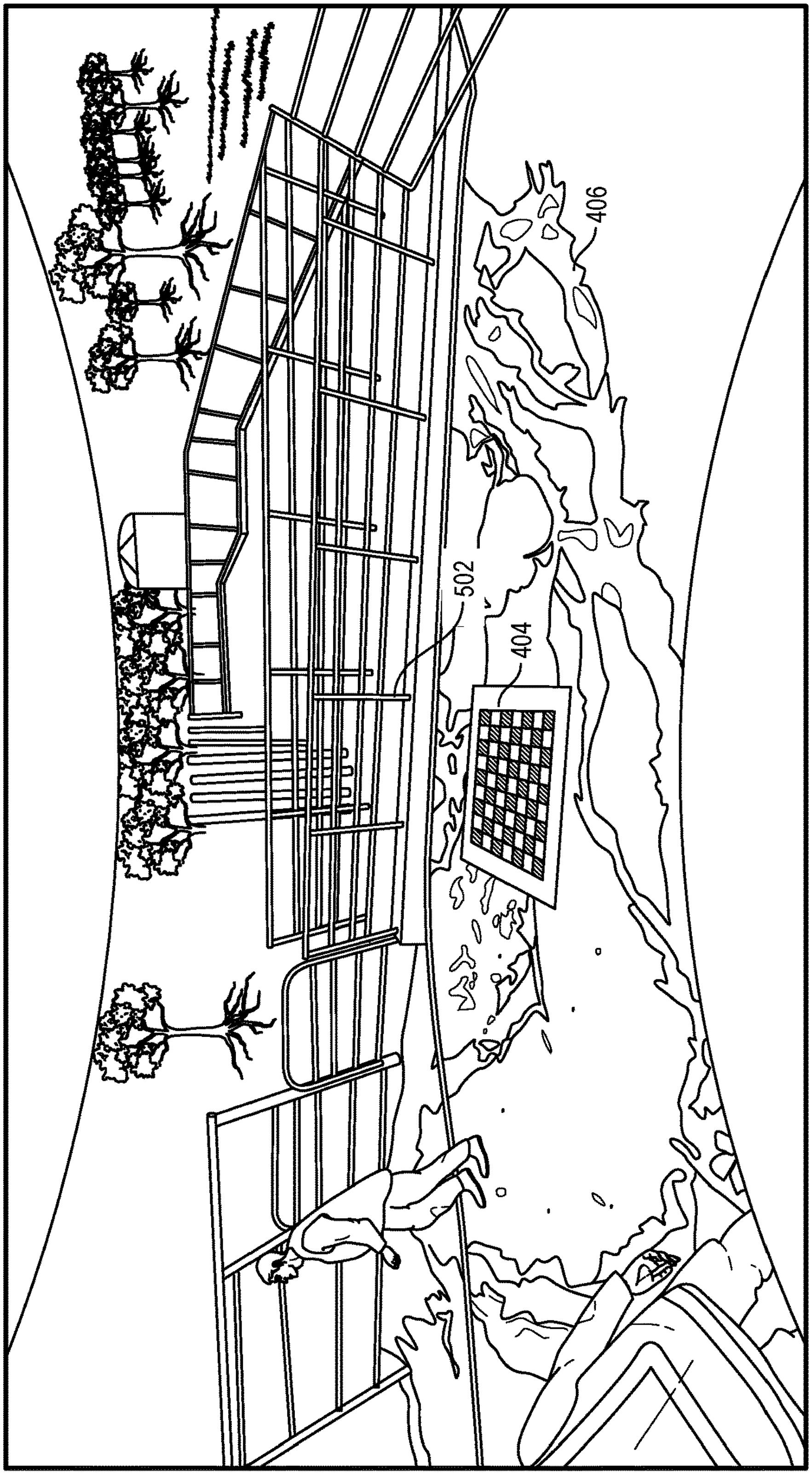
FIG. 5 shows an example of an undistorted image.

Images received from the camera are distorted. For example, an image obtained from a camera with a fisheye lens appears to be curved or have objects in the image skewed or crammed in a region of the image. This means that the image needs to be undistorted to straighten the objects in the image. An example of an undistorted image is shown in FIG. 5. The undistorted images are used to calibrate the homographies with respect to the perspective of the camera.

The 3D environment 400 is reconstructed using the single fixed camera 110. The camera is calibrated externally to obtain parameters defining orientations in the environment. These parameters include vectors and/or matrices that represent the translation and/or rotation of the position of the coordinate system of the camera 110 (or image plane 312) in relation to the coordinate system of the environment 400 and vice versa. This can be the orientation of reference surface 406 (or reference plane 306) with respect to the perspective of the camera 110 (or image plane 312). This is also known as homography.

An example involving a perspective-n-points algorithm is disclosed in Terzakis, George, and Manolis Lourakis. "A consistently fast and globally optimal solution to the perspective-n-point problem." European Conference on Computer Vision. Springer, Cham, 2020. (Terzakis). Homography, or plane parametrization from a 2D image, is described in Terzakis.

The reference surface 406 is represented by a reference plane 306 or a collection of reference planes. Each reference plane 306 has a coordinate system that is mapped to the coordinate system of the image plane 312 or the perspective of the camera 110 using the parameters of external calibration (homography). The reference plane 306 can be chosen arbitrarily, but in most practical setups the reference plane 306 comprises a portion of the ground. In the example shown in FIG. 4, the reference surface 406 comprises a ground surface within the environment of a race where cows walk with a small displacement.

To perform extrinsic calibration for the reference plane(s) 306 of the reference surface 406 with respect to the perspective of the camera 110, a calibration pattern 404 is placed on the reference surface 406 as shown in FIG. 5. The calibration pattern 404 has a checkerboard pattern. Other examples of calibration patterns include triangular grid, square grid, circle hexagonal grid and circle regular grid. Two or more, or each of the, corners of each pattern 404 are detected in the image 308 acquired from the camera 110. Without the calibration pattern 404, the reference plane 306 can still be calibrated by using any eight points on a reference plane 306 in the environment with known 3D positions captured in the image 308.

It is also possible to perform the calibration with a minimum of four points on a reference plane 306 if they are on the corners of an arbitrary rectangular shape on the reference plane 306.

In unconstrained environments, such as a farm, the ground can have varying slope. This means that the reference surface 406 cannot be approximated by one reference plane 306. Therefore, a calibration pattern 404 may be placed at multiple positions on the ground as shown in FIG. 4. Each calibration pattern 404 is used to obtain each of multiple reference planes 306 corresponding to the varying slope of the reference surface 406.

Once the coordinate system of the image plane 312 and the coordinate system of the reference plane 306 in the 3D environment 400 are mapped using homographies, the real physical 3D position 302 of any point 304 in the image 308 that lies on the reference plane 306 can be obtained (estimated). The 3D position 302 can be found at an intersection between a ray going from the camera optical center 310 through the image point 304 and the 3D reference plane 306.

In other words, a point in the image 308 has a 2D coordinate in the image plane 312 that can be reprojected back to 3D space by translation and/or rotation to a 3D coordinate in the reference plane 306 of the 3D environment 400 using homography. This translation and/or rotation is described, for example, in Criminisi, Antonio, Ian Reid, and Andrew Zisserman. "Single view metrology." International Journal of Computer Vision 40.2 (2000): 123-148 (Criminisi).

If the reference surface 406 in the camera view can be approximated by one reference plane 306, then using one calibration pattern 404 is enough to estimate any 3D position 302 on the ground of a point 304 in the image 308. For example, a flat reference surface 406 can be approximated by one reference plane 306.

If the reference surface 406 has varying slope, multiple reference planes 306 may be used to approximate the reference surface 406. Each of the multiple reference planes 306 has a local estimation or homography from the view of the camera 110. In other words, multiple homographies are obtained from the same perspective of different portions of reference surface 406. When determining the 3D position 302 of a point 304 in an image 308, each of the homographies corresponding to each reference plane 306 are used to obtain a 3D position estimate 302' of the point 304. Determining the 3D position 302 of the point 304 in the 2D image 308 comprises determining the 3D position 302 at least partly from one or a weighted average of at least two of the 3D position estimates 302".

The 3D position 302 of any point 304 on the reference surface 406 can be found from a weighted average of the 3D position estimates 302' from homographies or a subset of homographies closest to or at the point 304. The estimated positions 302' from homographies that are located closer to the point are weighted higher than the estimated positions 302' from homographies further away. In other words, a weighting assigned to one of the 3D position estimates 302' from a homography closer to the first point 304 is higher than a weighting assigned to one of the 3D position estimates from a homography further from the first point 304.

In other examples, 3D position estimates 302' from homographies relatively further away from the point 304 can be used to determine the 3D position 302. The 3D position 302 determined using additional 3D position estimates 302' can be more accurate than a 3D position 302 determined with fewer 3D position estimates 302'. This means that even if the reference surface 406 is flat, multiple homographies can still be used to obtain the 3D position 302 of a point 304 that is more accurate.

The 3D position 302 of a 2D point 304 located beyond the reference surface 406 can be obtained from a 3D position of a point 304 on the reference plane 306 or a plurality of reference planes 306. To estimate 3D positions of points above the ground, a reference projection direction 502 is required. The projection direction does not coincide with the reference planes 306 of the homographies. In other words, the projection direction is substantially perpendicular or not parallel to the reference planes 306 representing the reference surface 406.

As shown in FIG. 5, the reference projection direction 502 comprises the direction of gravity within the environment. The direction of gravity has a vanishing point that can be easily estimated from fence structures or several images of a weight hanging down on a piece of string. The reason for that is that gravity direction is easy to estimate in any man made environments (see FIG. 5). But even if there are no man made structures, the gravity direction can be estimated by a weight hanging on a string.

Figure 6:
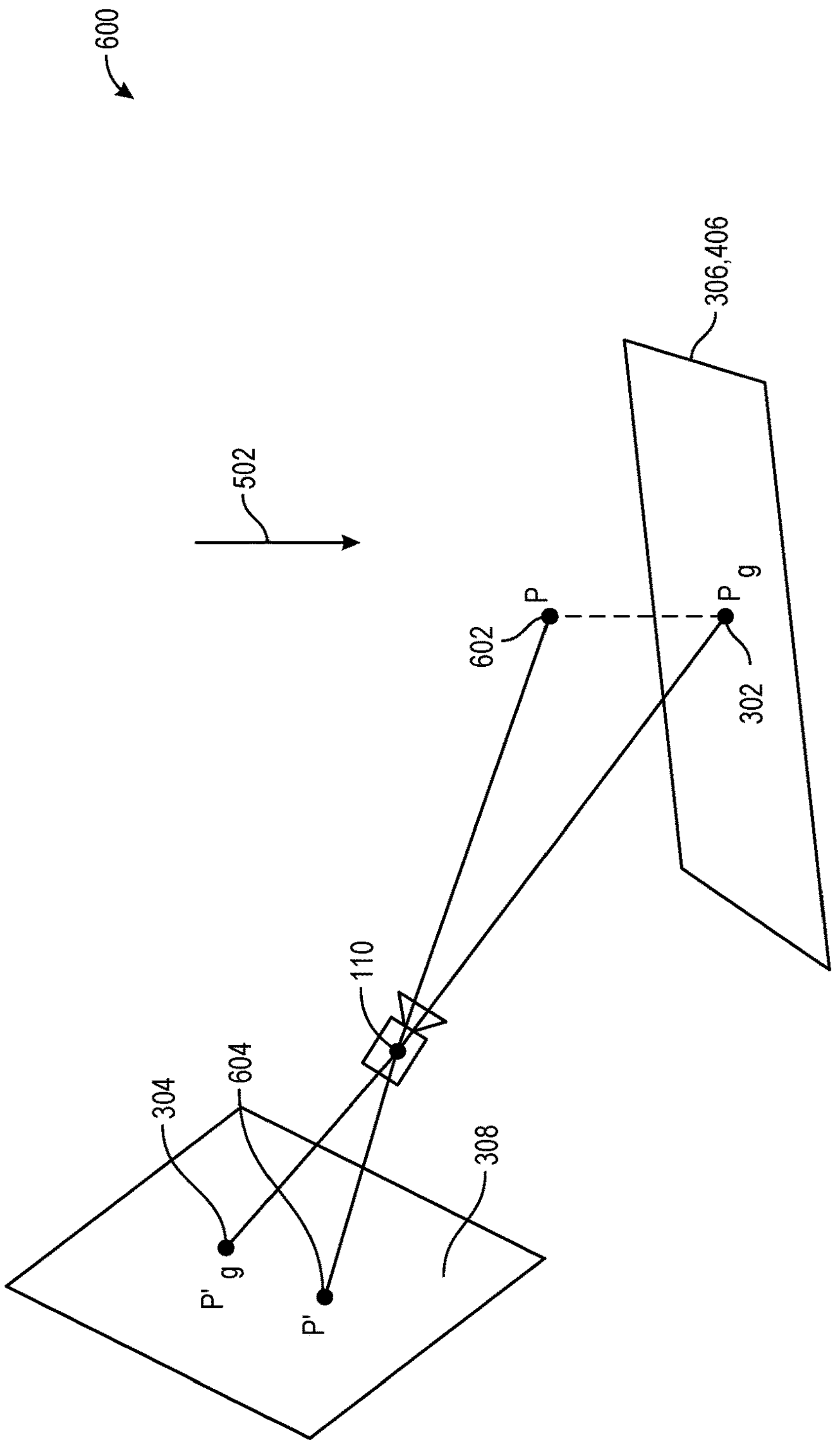
FIG. 6 shows an example of obtaining a 3D position of a point above the reference surface.

As shown in FIG. 6, the 3D position 602 of a point 604 above the reference surface 406 can be obtained if the position 302 of the point 304 in the image 308 is known. The position 302 below position 602 can be called a gravity shadow. If the corresponding gravity shadow point 304 is known for a point 604 in space in the image 308, a 3D position 302 of the gravity shadow point 304 can be obtained using the homographies described previously. A ray parallel to the reference projection direction 502 and extending through the gravity shadow position 302 and a ray extending through the point 604 and the camera optical center 310 are used to obtain the 3D position 602 of the point 604 above the reference surface 406. The intersection of the rays provides the position 602.

In other words, the 3D position 602, in space of the 3D environment 400, of point 604 in the image 308 is determined based at least partly from an intersection of a first ray substantially parallel to the reference projection direction 502 extending through the first point and a second ray extending through both the second point and a camera optical centre.

The position 302 of the first point 304 is the gravity shadow on the reference plane 306. The gravity shadow can also be determined from a plurality of gravity shadow position estimates 302' obtained at least partly from two or more of a plurality of homographies associated with the reference surface 406.

Determining the gravity shadow of a point with a 3D position in space can be challenging, especially if the 3D position 602 of the point hangs in space and doesn't belong to any object on the ground. Heuristics of estimating gravity shadows need to be chosen on a case by case basis.

Figure 7:
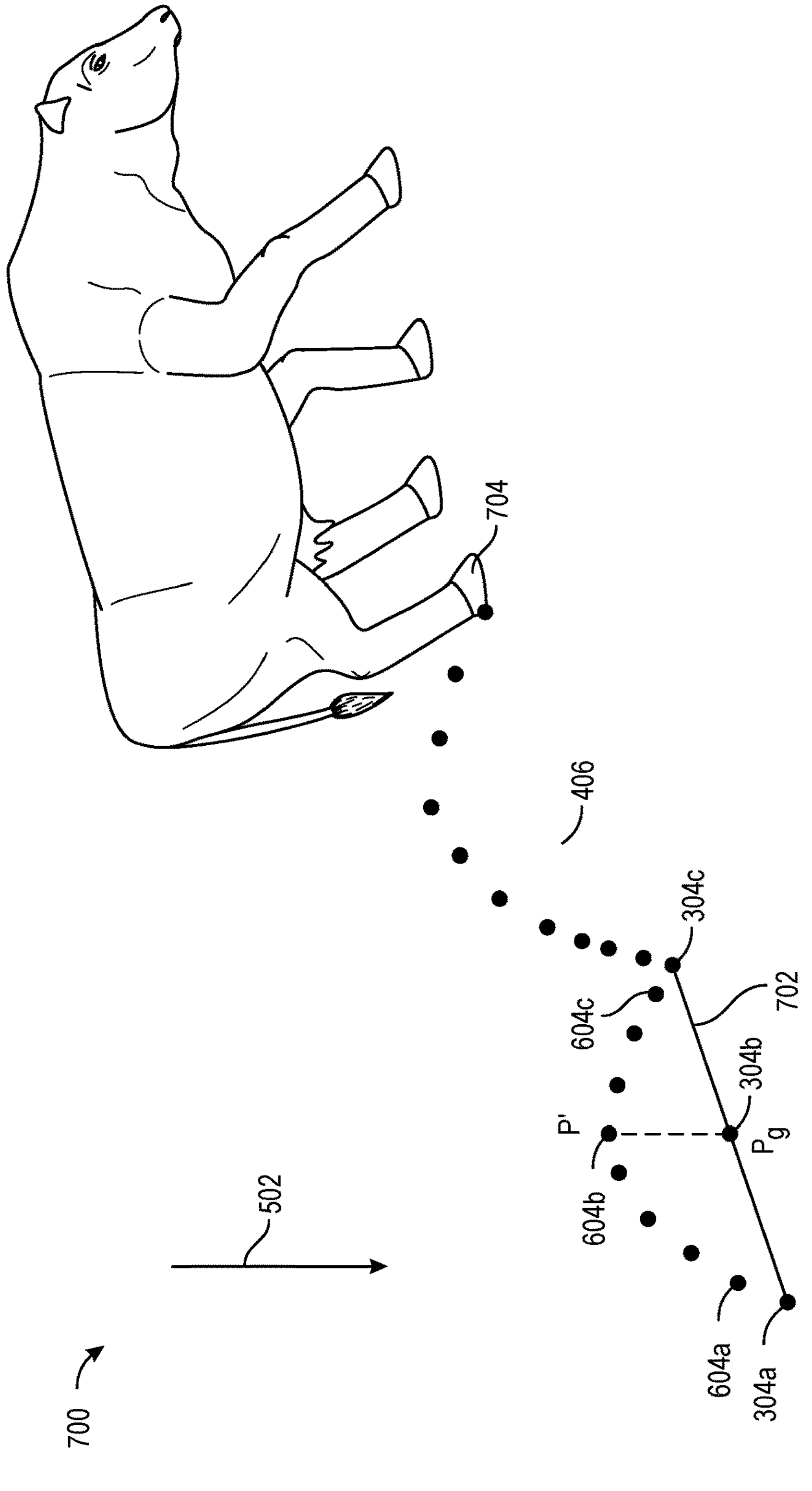
FIG. 7 shows an example of determining a gravity shadow.

An example of determining a gravity shadow is shown with reference to FIG. 7 with a moving hoof 704 of a cow. The hoof 704 can be filmed or tracked in a video or series of images for a step cycle. Each image of the video would be calibrated with the homographies associated with the reference surface 406 seen from a perspective of the fixed camera 110. In other words, each image is obtained from the fixed camera 110 associated with the same extrinsic calibration.

The gravity shadow (first point) 304*b* is a 2D point on the image plane 312 and lies on a ray 702 that extends through the 2D points 304*a* and 304*c* in the image plane 312. It is not necessary to determine the 3D positions of points 304*a* and 304*c* to determine the point 304*b* in the image plane if the ray 702 can be obtained on the image plane 312.

In an embodiment, the points 304*a* and 304*c* are obtained from other images with the same perspective of the 3D environment. Each of points 304*a* and 304*c* of other images correspond to different positions of a moving object, such as the hoof 704, on the reference surface 406.

For any hoof positions between the steps and above the reference surface 406 such as positions corresponding to points 604*a*, 604*b* and 604*c*, gravity shadow can be estimated as the intersection of two lines. For example, the point 304*b* in the image plane 312 is the gravity shadow of point 604*b*. Point 604*b* is in the image plane 312 and corresponds to a current position of the hoof 704 above the reference surface 406.

The gravity shadow point 304*b* is determined by the intersection of the ray 702 going through points 304*a* and 304*c* and a line going through point 604*b* that is parallel to the gravity direction 502 for the points 604*b* and 304*b*. The gravity direction 502 for any point in the image plane 312 is determined by connecting the point with the gravity vanishing point in the image plane 312. In other words, the gravity direction 502 of point 604*b* is the direction from point 604*b* to the gravity vanishing point.

The gravity shadow point 304*b* is a 2D point in the 2D image plane 312. The 3D position of the gravity shadow point 304*b* is determined using homographies of image plane 312 associated with the reference surface 406. Based on the 3D position 304*b* of the gravity shadow, the 3D position 604*b* of the hoof in space can be determined using the method described with reference to FIG. 6.

By determining 3D positions 302 of points 304 on reference surfaces 406 and 3D positions 602 of points 604 in space beyond the reference surfaces 406 in the image 308, the environment as captured in the image 308 can be reconstructed, as shown in FIG. 8 for example. This means that it is possible to obtain 3D positions 302, 602 of some points 304, 604 in the image 308 to reconstruct the whole of the environment. For some points such as the nose 802A and spine points 802C-802F and the ankles 802H, 802J, 802L, 802N located above the ground, a heuristic can be used to determine its gravity shadow position on the ground in a 2D image. For each ankle, it is safe to assume that it follows the same path as the hoof of the same leg. For the hoof 704 that will be the line 702. Then the gravity shadow of the ankle is on the intersection of the line 702 and the gravity direction 502 passing through the ankle in the 2D image. This way, 3D positions of the ankles can be found. Each hoof creates its own gravity shadow line 702. The animal's spine has its own gravity shadow line.

This line is assumed to be in the middle in between the hoofs. Each spine point 802A-802F then can be found at an intersection of this line and the gravity direction 502 passing through the corresponding spine point. The 3D positions of points are often obtained from a plurality of images 308 of the same image plane 312. The particular approach to determining how the gravity shadow path 702 is defined for any other point located above the ground surface 406 is determined on the case-by-case bases.

Figure 9:
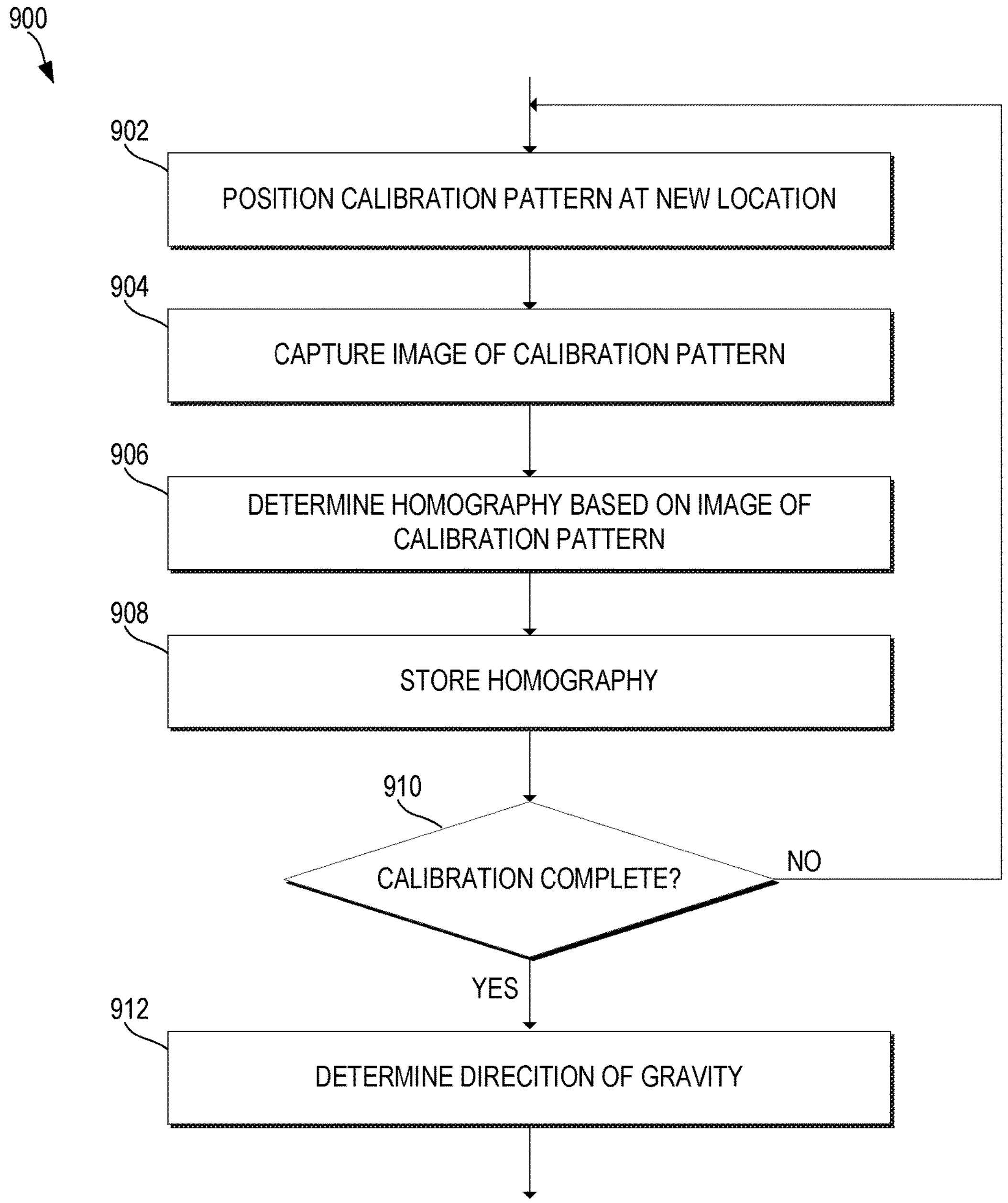
FIG. 9 is a simplified flow diagram of at least one embodiment of a method for calibrating a camera of a compute device.

Referring now to FIG. 9, in use, the compute device 100 may execute a method 900 for calibrating the camera 110. Some or all of the method 900 may be performed by the compute device 100 or by a user or administrator of the compute device 100. The method 900 begins in block 902, in which a user positions a calibration pattern 404 on a reference surface 406.

The user may position the calibration pattern 404 in any suitable manner, such as at the direction of the compute device 100, in a pattern of an environment that covers some or all of the relevant ground surface of the environment, etc. The calibration pattern may be, e.g., a checkerboard pattern, a triangular grid, a square grid, a circle hexagonal grid, a circle regular grid, or other predetermined pattern.

In block 904, the camera 110 captures one or more images of the calibration pattern 404. In block 906, the compute device 100 determines a homography to relate 3D positions on the ground near the calibration pattern 404 to 2D positions on images captured by the camera 110. In block 908, the compute device 100 stores the homography.

In block 910, if calibration is not complete, the method 900 loops back to block 902, where a user can reposition the calibration pattern 404 at a new location. If the calibration is complete, the method 900 proceeds to block 912, in which the compute device 100 determines a direction of gravity. The compute device 100 may determine a direction of gravity by identifying one or more vertical structures, such as posts 408. In some embodiments, the compute device 100 may determine a direction of gravity based on a weight hanging on a string. In other embodiments, a user may identify a direction of gravity. The compute device 100 may now be used to monitor the 3D location of objects in the field of view of the camera 110.

Figure 10:
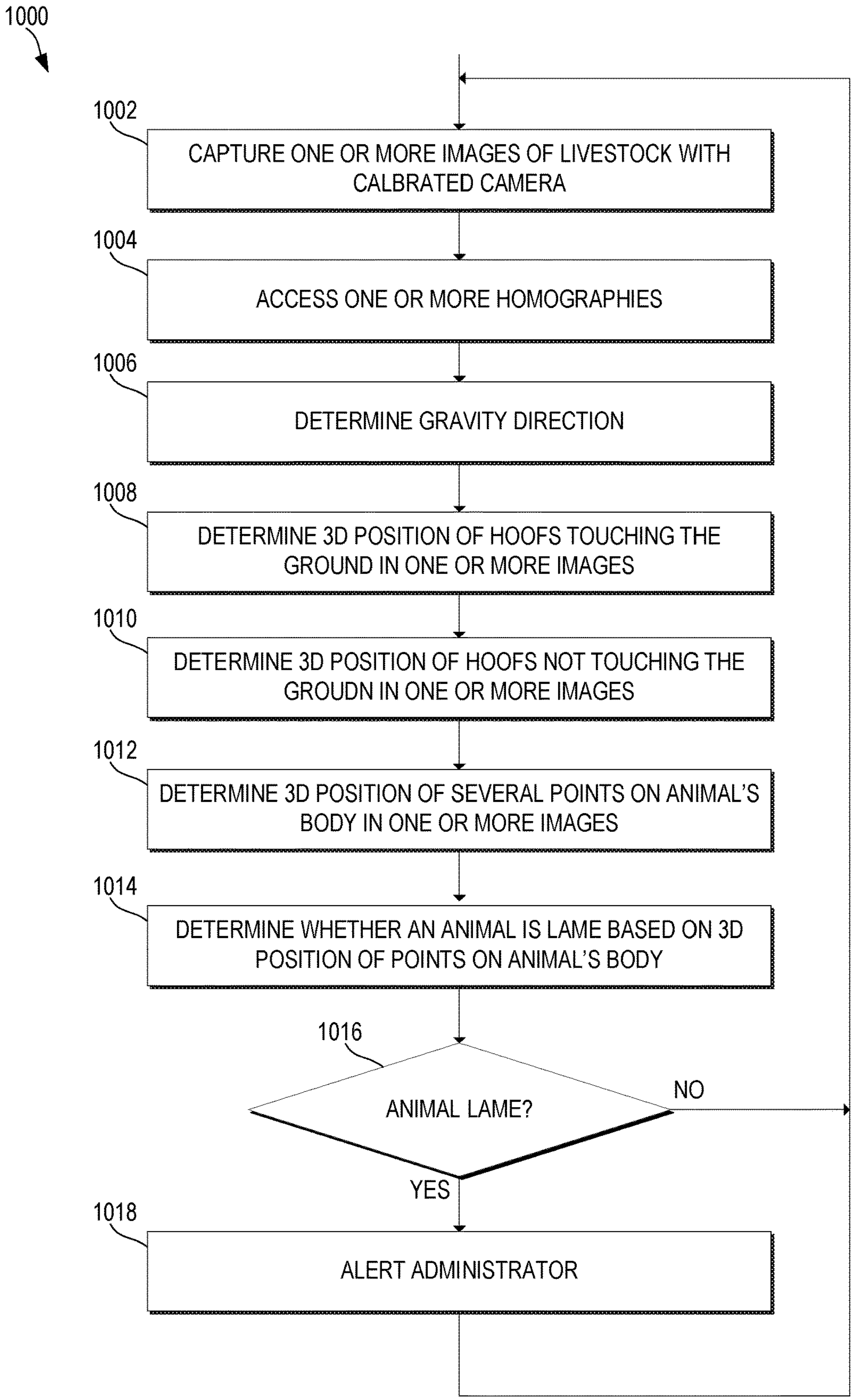
FIG. 10 is a simplified flow diagram of at least one embodiment of a method for using a camera of a compute device to monitor livestock.

Referring now to FIG. 10, in use, the compute device 100 may execute a method 1000 for monitoring livestock. The method 1000 begins in block 1002, in which a calibrated camera 110 of a compute device 100 captures one or more images of livestock. In the illustrative embodiment, the camera 110 is connected to and forms part of the compute device 100. In other embodiment, the camera 110 may be separate from or remote from the compute device 100. In the illustrative embodiment, the compute device 100 processes images from the camera 110 in real time. In other embodiments, the compute device 100 may process images at a later time, or the compute device 100 may receive images from the camera 110 and process the images at a later time when not connected to the camera 110.

In block 1004, the compute device 100 accesses one or more homographies, such as one or more homographies created using the method 900. The compute device 100 may access one or more homographies based on an area of interest identified in the one or more images. In block 1006, the compute device 100 determines a gravity direction, such as by accessing a saved gravity direction determined as part of performing the method 900.

In block 1008, the compute device 100 identifies the position of a hoof or other part of an animal that is in contact with the ground, and the compute device 100 identifies a 3D position of the hoof or other part of the animal based on the position of the hoof or other part of the animal in the 2D image captured by the camera 110 and one or more homographies. The compute device 100 may identify a hoof or other animal part that is one the ground in any suitable manner, such as identifying a hoof or other animal part that has not moved in a particular period of time. The compute device 100 may determine a position estimate using each of several homographies, and then the compute device 100 may determine a final position based on a weighted average of the position estimates. The weighted average may weight the position estimates based on a distance between the hoof or other animal part being identified and the calibration pattern 404 corresponding to the homography.

In block 1010, the compute device 100 determines the positions of hoofs not touching the ground in one or more images. In the illustrative embodiment, the compute device 100 identifies the 3D location of two consecutive positions 304*a* and 304*c* of the same hoof 704 on the ground. The compute device 100 identifies a line connecting these two points. For example, the line 702 connects the position 304*a* where the hoof 704 was placed on the ground and the position 304*c* wherein the animal next placed its hoof. Given the line 702 and the position of the hoof 704 in the 2D image (for example, 2D point 604*b*) between the points 304*a* and 304*c*, the compute device 100 can determine the 3D position of the hoof, assuming that the hoof 704 followed a path in a plane defined by the line 702 and the gravity direction.

In block 1012, the compute device 100 determines the 3D position of several points on an animal's body in one or more images. For example, the compute device 100 may determine the location of a nose 802A, a top of the head 802B, a base of the neck 802C, a first point on the back 802D, a second point on the back 802E, the top of the rump 802F, hoofs 802G, 802I, 802K, 802M, and ankles 802H, 802J, 802L, 802N. The compute device 100 may determine a path 804 that each point 802A-802N takes, as shown in FIG. 8 for the hoof 802M. The various points of the animal may be identified in any suitable manner, such as using the homographies, a machine-learning based model, the 3D hoof positions, etc.

In block 1014, the compute device 100 may analyse the positions of various parts of the animal's body to determine whether the animal is lame. The compute device 100 may analyse parameters such as step length, joint stiffness, pose, etc. The compute device 100 may use any suitable technique to determine whether an animal is lame, such as a machine-learning-based model.

In block 1016, if the animal is lame, the method 1000 proceeds to block 1018, in which the compute device 100 alerts an administrator or other person that the animal is lame, such as by writing a message to a log file, sending an email, sending a text message, sending an online alert, etc. After alerting the administrator or if the animal is not lame, the method 1000 loops back to block 1002 to continue capturing images of the livestock.

This method has the potential to allow the correction of perspective projection distortion and measurement of real world distances (single view metrology) in unconstrained environment with no clear horizontal or vertical surfaces.

In the illustrative embodiment described above, the compute device 100 can be used to monitor cattle. In other embodiments, the compute device 100 may be used to monitor other livestock, such as sheep, pigs, chickens, turkeys, etc. In other embodiments, the compute device 100 may be used to monitor environments other than those including livestock, such as sporting events, motion capture environments, etc.

The foregoing description includes preferred forms thereof. Modifications may be made thereto without departing from the scope of the disclosure, as defined by the accompanying claims.

EXAMPLES

Example 1 includes a compute device comprising a processor; a memory coupled to the processor: one or more non-transitory computer readable media comprising a plurality of instructions that, when executed by the processor, cause the processor to receive one or more images captured by a camera: identify an object on a ground surface in the one or more images; select, based on a two-dimensional position of the object in the one or more images, one or more homographies from a plurality of homographies, wherein the plurality of homographies are usable to determine a three-dimensional position of the object in an environment of the one or more images; and determine, based on the one or more images and the one or more homographies, a three-dimensional position of the object in the environment of the one or more images.

Example 2 includes the subject matter of Example 1, and wherein the one or more homographies comprises two or more homographies, wherein to determine, based on the one or more images and the one or more homographies, a three-dimensional position of the object in the environment of the one or more images comprises to determine, for each of the two or more homographies, an estimated position of the object; and determine a final position of the object based on a weighted average of the estimated positions corresponding to the two or more homographies.

Example 3 includes the subject matter of any of Examples 1 and 2, and wherein the plurality of instructions further cause the processor to determine a gravity direction in the one or more images; and identify a three-dimensional position of an additional object above the ground surface based on the one or more homographies, the one or more images, and the gravity direction.

Example 4 includes the subject matter of any of Examples 1-3, and wherein to determine the gravity direction comprises to determine a gravity direction based on a vertical object identified in an image captured by the camera.

Example 5 includes the subject matter of any of Examples 1-4, and wherein to determine the gravity direction comprises to determine a gravity direction based on a weight on a string identified in an image captured by the camera.

Example 6 includes the subject matter of any of Examples 1-5, and wherein to determine the gravity direction comprises to access an indication of the gravity direction stored on the compute device.

Example 7 includes the subject matter of any of Examples 1-6, and wherein the object is part of an animal, wherein the plurality of instructions further cause the processor to determine, based at least in part on the three-dimensional position of the object, whether the animal is lame.

Example 8 includes the subject matter of any of Examples 1-7, and wherein the plurality of instructions further cause the processor to receive one or more calibration images captured by the camera, wherein each of the one or more calibration images include a calibration pattern on the ground surface; and calculate the one or more homographies based on the one or more calibration images.

Example 9 includes the subject matter of any of Examples 1-8, and wherein each of the plurality of homographies correspond to a different position and orientation of the ground surface in a field of view of the camera.

Example 10 includes the subject matter of any of Examples 1-9, and further including the camera.

Example 11 includes one or more non-transitory computer readable media comprising a plurality of instructions that, when executed by a compute device, cause the compute device to receive one or more images captured by a camera: identify an object on a ground surface in the one or more images: select, based on a two-dimensional position of the object in the one or more images, one or more homographies from a plurality of homographies, wherein the plurality of homographies are usable to determine a three-dimensional position of the object in an environment of the one or more images; and determine, based on the one or more images and the one or more homographies, a three-dimensional position of the object in the environment of the one or more images.

Example 12 includes the subject matter of Example 11, and wherein the one or more homographies comprises two or more homographies, wherein to determine, based on the one or more images and the one or more homographies, a three-dimensional position of the object in the environment of the one or more images comprises to determine, for each of the two or more homographies, an estimated position of the object; and determine a final position of the object based on a weighted average of the estimated positions corresponding to the two or more homographies.

Example 13 includes the subject matter of any of Examples 11 and 12, and wherein the plurality of instructions further cause the compute device to determine a gravity direction in the one or more images; and identify a three-dimensional position of an additional object above the ground surface based on the one or more homographies, the one or more images, and the gravity direction.

Example 14 includes the subject matter of any of Examples 11-13, and wherein to determine the gravity direction comprises to determine a gravity direction based on a vertical object identified in an image captured by the camera.

Example 15 includes the subject matter of any of Examples 11-14, and wherein to determine the gravity direction comprises to determine a gravity direction based on a weight on a string identified in an image captured by the camera.

Example 16 includes the subject matter of any of Examples 11-15, and wherein to determine the gravity direction comprises to access an indication of the gravity direction stored on the compute device.

Example 17 includes the subject matter of any of Examples 11-16, and wherein the object is part of an animal, wherein the plurality of instructions further cause the compute device to determine, based at least in part on the three-dimensional position of the object, whether the animal is lame.

Example 18 includes the subject matter of any of Examples 11-17, and wherein the plurality of instructions further cause the compute device to receive one or more calibration images captured by the camera, wherein each of the one or more calibration images include a calibration pattern on the ground surface; and calculate the one or more homographies based on the one or more calibration images.

Example 19 includes the subject matter of any of Examples 11-18, and wherein each of the plurality of homographies correspond to a different position and orientation in a field of view of the camera.

Example 20 includes a method for determining a three-dimensional (3D) position of a point in a two-dimensional (2D) image of an environment, the method comprising receiving the image of the environment, the image associated with a plurality of homographies mapping between points in an image plane and points in the environment; identifying, within the image, a reference surface within the environment: determining respective 3D position estimates of a first point on the reference surface at least partly from two or more of the plurality of homographies; and determining a 3D position of the first point in the 2D image at least partly from an average of at least two of the 3D position estimates.

Example 21 includes the subject matter of Example 20, and wherein at least some of the plurality of homographies are associated with a portion of the reference surface with varying slope.

Example 22 includes the subject matter of any of Examples 20 or 21, and determining the 3D position of the point in the 2D image comprises determining the 3D position at least partly from a weighted average of the at least two of the 3D position estimates, wherein a weighting assigned to one of the 3D position estimates from a homography closer to the first point is higher than a weighting assigned to one of the 3D position estimates from a homography further from the first point.

Example 23 includes the subject matter of any of Examples 20-22, and further including determining a reference projection direction within the environment; and determining a 3D position of a second point in the image based at least partly from an intersection of a first ray substantially parallel to the reference projection direction extending through the first point and a second ray extending through both the second point and a camera optical centre.

Example 24 includes the subject matter of any of Examples 20-23, and wherein the reference surface comprises a ground surface within the environment, and the reference projection direction comprises a direction of gravity within the environment.

Examples 25 includes the subject matter of any of Examples 20-24, and wherein the first point is on a ray that extends through first points of other images with the same perspective of the environment, wherein each of the first points of other images correspond to different positions of a moving object on the reference surface.

Example 26 includes the subject matter of any of Examples 20-25, and wherein the image captures a plurality of calibration patterns on the reference surface.

The invention claimed is:

1. A compute device comprising:
- a processor;
- a memory coupled to the processor; and
- one or more non-transitory computer readable media comprising a plurality of instructions that, when executed by the processor, cause the processor to:
  - receive one or more images captured by a camera;
  - identify an object on a ground surface in the one or more images;
  - select, based on a two-dimensional position of the object in the one or more images, one or more homographies from a plurality of homographies, wherein the plurality of homographies are configured to determine a three-dimensional position of the object in an environment of the one or more images;
  - determine, based on the one or more images and the one or more homographies, a three-dimensional position of the object in the environment of the one or more images;
  - determine a gravity direction in the one or more images; and
  - identify a three-dimensional position of an additional object above the ground surface based on the one or more homographies, the one or more images, and the gravity direction.

2. The compute device of claim 1, wherein the one or more homographies comprises two or more homographies, wherein to determine, based on the one or more images and the one or more homographies, a three-dimensional position of the object in the environment of the one or more images comprises to:
- determine, for each of the two or more homographies, an estimated position of the object; and
- determine a final position of the object based on a weighted average of the estimated positions corresponding to the two or more homographies.

3. The compute device of claim 1, wherein to determine the gravity direction comprises to determine a gravity direction based on a vertical object identified in an image captured by the camera.

4. The compute device of claim 1, wherein to determine the gravity direction comprises to access an indication of the gravity direction stored on the compute device.

5. The compute device of claim 1, wherein the object is part of an animal, wherein the plurality of instructions further cause the processor to determine, based at least in part on the three-dimensional position of the object, whether the animal is lame.

6. The compute device of claim 1, wherein the plurality of instructions further cause the processor to:
- receive one or more calibration images captured by the camera, wherein each of the one or more calibration images include a calibration pattern on the ground surface; and
- calculate the one or more homographies based on the one or more calibration images.

7. The compute device of claim 1, wherein each of the plurality of homographies correspond to a different position and orientation of the ground surface in a field of view of the camera.

8. The compute device of claim 1, further comprising the camera.

9. The compute device of claim 1, wherein the additional object comprises a body part of an animal, wherein the plurality of instructions further cause the processor to track movement of the body part over a plurality of the one or more images based at least in part on respective three-dimensional positions of the body part.

10. The compute device of claim 9, wherein the plurality of instructions further cause the processor to determine a gait parameter of the animal based at least in part on the tracked movement of the body part,
- wherein the gait parameter comprises one or more of a stride length, a step height, a stance duration, or a movement symmetry parameter,
- wherein the plurality of instructions further cause the processor to determine whether the animal is lame based at least in part on the gait parameter.

11. The compute device of claim 1, wherein identifying the additional object above the ground surface based on the gravity direction comprises:
- determining a projection ray extending through a two-dimensional position of the additional object in the one or more images and a camera optical centre;
- determining a gravity ray extending from the three-dimensional position of the object on the ground surface in a direction parallel to the gravity direction; and
- determining the three-dimensional position of the additional object based at least in part on an intersection of the projection ray and the gravity ray.

12. The compute device of claim 11, wherein the plurality of instructions further cause the processor to determine a height of the additional object above the ground surface based at least in part on a distance, along the gravity direction, between the three-dimensional position of the object on the ground surface and the three-dimensional position of the additional object.

13. One or more non-transitory computer readable media comprising a plurality of instructions that, when executed by a compute device, cause the compute device to:
- receive one or more images captured by a camera;
- identify an object on a ground surface in the one or more images;
- select, based on a two-dimensional position of the object in the one or more images, one or more homographies from a plurality of homographies, wherein the plurality of homographies are configured to determine a three-dimensional position of the object in an environment of the one or more images;

determine, based on the one or more images and the one or more homographies, a three-dimensional position of the object in the environment of the one or more images;

determine a gravity direction in the one or more images; and identify a three-dimensional position of an additional object above the ground surface based on the one or more homographies, the one or more images, and the gravity direction.

14. The one or more non-transitory computer readable media of claim 13, wherein the one or more homographies comprises two or more homographies, wherein to determine, based on the one or more images and the one or more homographies, a three-dimensional position of the object in the environment of the one or more images comprises to:

determine, for each of the two or more homographies, an estimated position of the object; and determine a final position of the object based on a weighted average of the estimated positions corresponding to the two or more homographies.

15. The one or more non-transitory computer readable media of claim 13, wherein each of the plurality of homographies correspond to a different position and orientation in a field of view of the camera.

16. A method for determining a three-dimensional (3D) position of a point in a two-dimensional (2D) image of an environment, the method comprising:

receiving the image of the environment, the image associated with a plurality of homographies mapping between points in an image plane and points in the environment;

identifying, within the image, a reference surface within the environment;

determining respective 3D position estimates of a first point on the reference surface at least partly from two or more of the plurality of homographies;

determining a 3D position of the first point in the 2D image at least partly from an average of at least two of the 3D position estimates;

determining a reference projection direction within the environment; and determining a 3D position of a second point in the image based at least partly on an intersection of a first ray substantially parallel to the reference projection direction extending through the first point and a second ray extending through both the second point and a camera optical centre, wherein the reference surface comprises a ground surface within the environment, and the reference projection direction comprises a direction of gravity within the environment.

17. The method of claim 16, wherein at least some of the plurality of homographies are associated with a portion of the reference surface with varying slope.

18. The method of claim 16, wherein determining the 3D position of the point in the 2D image comprises determining the 3D position at least partly from a weighted average of the at least two of the 3D position estimates, wherein a weighting assigned to one of the 3D position estimates from a homography closer to the first point is higher than a weighting assigned to one of the 3D position estimates from a homography further from the first point.

19. The method of claim 16, wherein the first point is on a ray that extends through first points of other images with the same perspective of the environment;

wherein each of the first points of other images correspond to different positions of a moving object on the reference surface.

20. The method of claim 16, wherein the image captures a plurality of calibration patterns on the reference surface.

* * * * *